United States Patent
Hayashi et al.

[11] Patent Number: 5,987,166
[45] Date of Patent: *Nov. 16, 1999

[54] IMAGE PROCESSING APPARATUS CAPABLE OF MARKER EDITING ORIGINAL IMAGE

[75] Inventors: Toshio Hayashi, Kawasaki; Kiyohisa Sugishima, Yokohama; Masayuki Hirose, Kawasaki; Shigeo Yamagata, Yokohama; Fumio Mikami, Chigasaki; Eiichi Motoyama, Tokyo; Koji Arai, Kawaguchi; Takashi Nonaka, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/548,522

[22] Filed: Oct. 26, 1995

[30] Foreign Application Priority Data

Oct. 28, 1994 [JP] Japan .................................. 6-289163

[51] Int. Cl.$^6$ ...................................................... G06K 9/00
[52] U.S. Cl. ........................... 382/163; 358/515; 358/518; 382/175
[58] Field of Search ..................................... 382/164, 173, 382/175, 180, 163; 358/538, 453, 537, 452, 518, 515

[56] References Cited

U.S. PATENT DOCUMENTS

| | | | |
|---|---|---|---|
| 4,937,662 | 6/1990 | Matsunawa et al. | 358/461 |
| 5,029,224 | 7/1991 | Fujisawa | 358/453 |
| 5,136,401 | 8/1992 | Yamamoto et al. | 358/515 |
| 5,241,609 | 8/1993 | Hasebe et al. | 358/453 |
| 5,245,417 | 9/1993 | Hibi et al. | 358/515 |
| 5,305,122 | 4/1994 | Hayashi et al. | 358/530 |
| 5,436,735 | 7/1995 | Tanabe et al. | 358/453 |
| 5,548,663 | 8/1996 | Sekine et al. | 358/538 |

*Primary Examiner*—Yon J. Couso
*Attorney, Agent, or Firm*—Fitzpatrick, Cella, Harper & Scinto

[57] ABSTRACT

It is an object to provide an image processing apparatus which can obtain an image reproduction that accurately corresponds to an original color when an ordinary color original is read and which can obtain an accurate marker edition result when a marker original is read. When a color scanning mode to read the color image is selected, an original ground removal by a prescan is not performed. When a marker edition scanning mode to read the marker original is selected, the original ground removal is executed. Thus, a color reproduction which accurately corresponds to the original is executed in the color scanning mode. In the marker edition scanning mode, the color recognition of the marker color is accurately performed without being influenced by the ground color.

63 Claims, 9 Drawing Sheets

IMAGE PROCESSING APPARATUS CAPABLE OF MARKER EDITING ORIGINAL IMAGE

BACKGROUND OF THE INVENTION

1. Field of the Invention

The invention relates to an image processing apparatus which can marker edit an original image.

2. Related Background Art

Recently, a marker editing function for coloring a desired range by surrounding or tracing the desired range on a black and white original by a commercially available marker pen has been proposed. Generally, such a marker editing function has a plurality of modes such as painting mode, line mode, and the like. Namely, in the painting mode, as shown in, for example, FIG. 10A, on an original having a white ground, the inside of a desired closed interval 101 decided by a black line is colored by a blue color marker 102, thereby coloring the whole closed interval in blue as shown in FIG. 10B and printing out the resultant original. In the line mode, as shown in FIG. 11A, on an original having a white ground, a circumference of a desired black line 111 is colored by a red color marker 112, thereby converting the black line into a red line and coloring as shown in FIG. 11B and printing out the resultant original.

A discrimination of the painting mode shown in FIGS. 10A and 10B will now be described.

Now, explanation will be made on the assumption that a scanner having a marker editing function is a scanner of the general raster scanning system using a line sensor.

Now assuming that a reading line at a certain timing is a line A during the reading operation of the image shown in FIG. 10A, in the case where the output order of pixel data is set to the direction shown by an arrow, as for the pixels of the line A, color data is sequentially outputted from the line sensor in accordance with the order of . . . , white, black, blue, white, . . . , white, blue, black, white, . . . Therefore, by detecting the existence of black just before blue which appears first, it is discriminated that the painting mode was started from the first blue pixel.

By detecting the existence of black just after last blue, on the other hand, it is discriminated that the painting mode is finished at the last blue pixel. Therefore, by outputting all of the pixels (blue, white, . . . , white, blue) between the painting modes as blue data, the painting mode is realized.

A discrimination of the line mode shown in FIGS. 11A and 11B will now be described.

When it is now assumed that a reading line at a certain timing is a line B during the reading operation of the image of FIG. 11A, in the case where the output order of pixel data is set to the direction shown by an arrow, as for the pixels of the line B, color data is sequentially outputted from the line sensor in accordance with the order of . . . , white, red, black, . . . , black, red, white, . . . Therefore, by detecting the existence of white just before red which appears first, it is discriminated that the line mode was started from the first red pixel.

By detecting the existence of white just after last red, it is discriminated that the line mode is finished at the last red pixel. Therefore, among the pixels (red, black, . . . , black, red) between the line modes, by outputting the red pixel as white data and the black pixel as red data, the line mode is realized.

Schematically speaking, the apparatus is controlled in the following manner. A starting mode is determined in dependence on whether the pixel just before the pixel of which the color of the marker was first detected is white or black. When the starting mode is the painting mode, so long as the pixel just after the pixel of which the color of the marker was detected lastly is black, the mode is finished. When the starting mode is the line mode, so long as the pixel just after the pixel of which the color of the marker was detected lastly is white, the mode is finished.

However, the scanner with the marker editing function of the construction as mentioned above has the following problems.

When performing the marker edition by the marker editing function provided for the color scanner, various paper qualities of originals are considered. There are also various ground colors depending on the paper qualities. Even in case of the originals of the same paper quality, a color change due to an aging deterioration is also considered.

On the other hand, almost of the commercially available color markers use semitransparent inks in order to leave information of a colored line or character. There is, consequently, a case where the colored area of the marker is set to a color in which the marker color is multiplexed to the ground color of the original and the marker color is erroneously discriminated.

SUMMARY OF THE INVENTION

It is an object of the invention to provide an image processing apparatus which can solve the above problems.

Another object of the invention is to provide an image processing apparatus in which when an ordinary color original is read, an image reproduction which accurately corresponds to the original color can be obtained and, when a marker original is read, an accurate marker edition result can be obtained.

The above and other objects and features of the present invention will become apparent from the following detailed description and the appended claims with reference to the accompanying drawings.

DETAILED DESCRIPTION OF THE PREFERRED EMBODIMENTS

Figure 1:
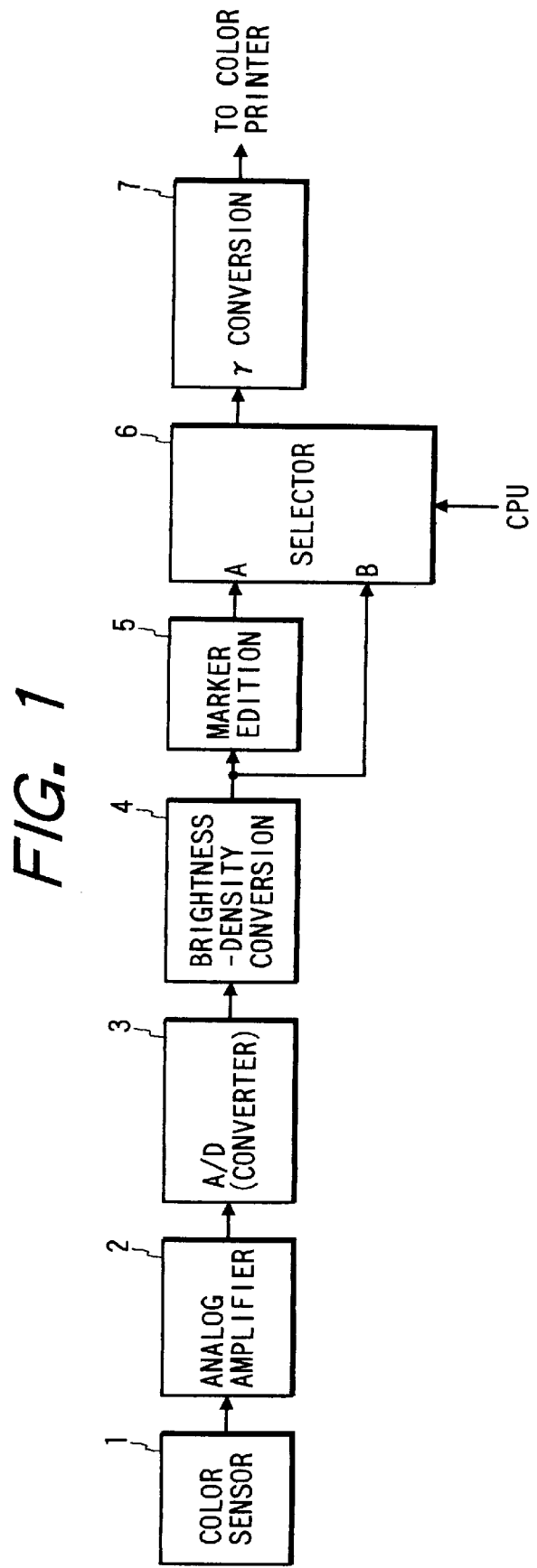
FIG. 1 is a block diagram showing a schematic construction of the first embodiment of an image processing apparatus according to the invention.

FIG. 1 is a block diagram showing a schematic construction of the first embodiment of an image processing apparatus according to the invention.

In the image processing apparatus, an original image read by a color sensor 1 is inputted to an analog amplifier 2 as brightness signals of R (red), G (green), and B (blue) and those brightness signals are amplified. Outputs of the analog amplifier 2 are converted to, for example, 8-bit digital signals by an A/D converter 3.

Output signals of the A/D converter 3 are inputted to a brightness-density conversion circuit 4 and are converted into density data of C (cyan), M (magenta), Y (yellow), and K (black). Outputs of the brightness-density conversion circuit 4 are inputted to a marker edition circuit 5 and an input terminal B of a selector 6. The marker edition circuit 5 discriminates the marker color in a marker editing mode (color processing mode) and executes a predetermined color edition and generates the corrected density data of C, M, Y, and K for the input data. Outputs of the marker edition circuit 5 are inputted to an input terminal A of the selector 6.

The selector 6 is controlled by a CPU (not shown) so as to select the input B in a color scanning mode for reading a color image and to select the input A in a maker editing mode for reading an original marked by a marker pen and performing an edition according to the mark. An output of the selector 6 is inputted to a γ (gamma) conversion circuit 7. A color correction that is optimum to a printer connected is executed. A color printer outputs a print output in accordance with data outputted from the γ conversion circuit 7.

Figure 2:
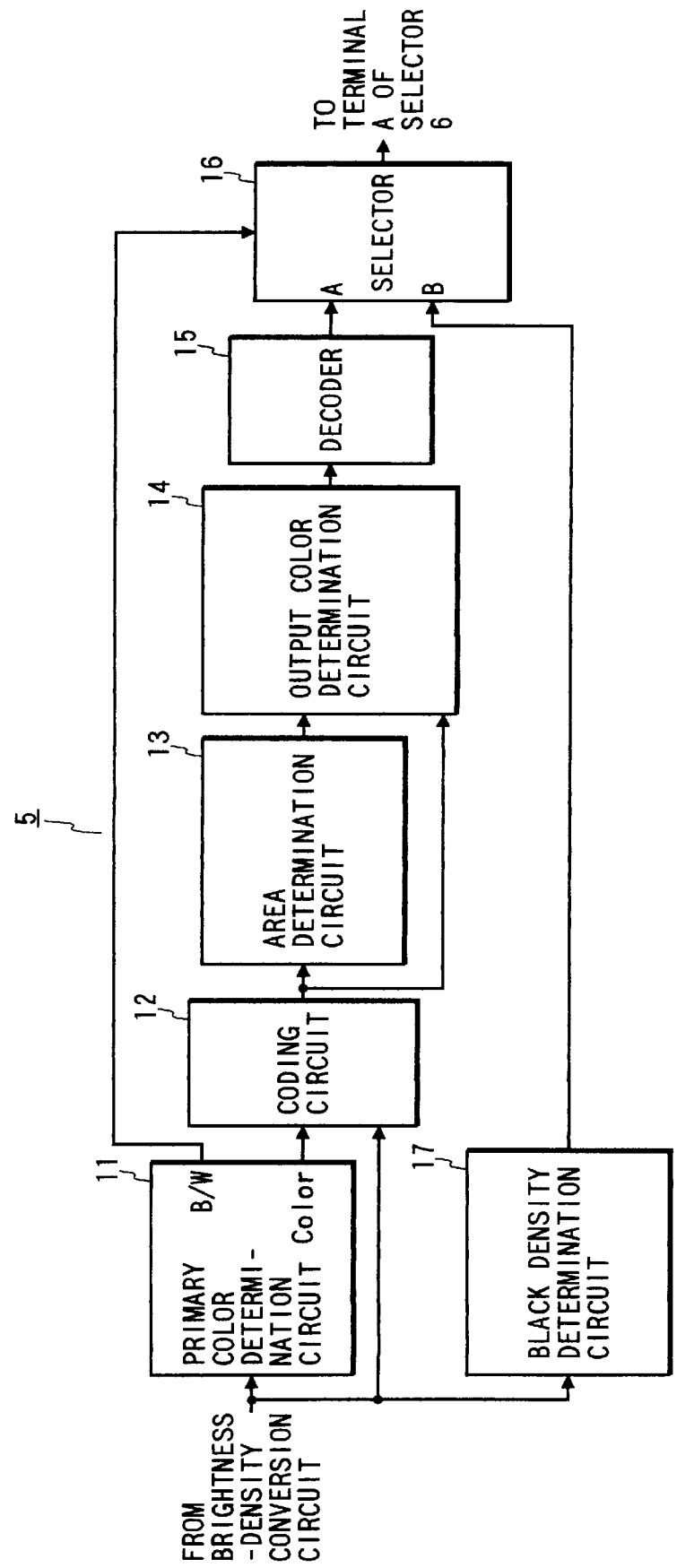
FIG. 2 is a block diagram showing an internal construction of a marker edition circuit 5 in FIG. 1.

FIG. 2 is a block diagram showing an internal construction of the marker edition circuit 5 in FIG. 1.

In the diagram, reference numeral 11 denotes a primary color determination circuit for discriminating which one of the color components C, M, and Y constructing the color of the pixel data that is outputted from the brightness-density conversion circuit 4 is the primary component. A discrimination result is outputted from a Color terminal and is inputted to a coding circuit 12. At the same time, a check is made to see if the color of the pixel data is an achromatic color or not. A discrimination result is outputted from a B/W terminal, thereby controlling the selecting operation of a selector 16.

On the other hand, the pixel data that is outputted from the brightness-density conversion circuit 4 is also inputted to the coding circuit 12. The color of the original or the marker color used are discriminated from a discrimination result of the primary color determination circuit 11 and the pixel data and, at the same time, the determined color is coded. By the coding circuit 12, an information amount of the original is remarkably compressed, thereby enabling a circuit scale of the subsequent image processing circuit to be reduced.

For example, in the case where the output of the brightness-density conversion circuit 4 consists of eight bits, the total bits of the input is equal to 32 for four colors of C, M, Y, and K. On the other hand, even when the total number of colors of the color (white or black) of the original and the colors of the markers is discriminated to 32 colors, an output of the coding circuit 12 can be constructed as a 6-bit output.

The output of the coding circuit 12 is inputted to an area determination circuit 13 and an output color determination circuit 14. As already been explained in conjunction of FIGS. 10A, 10B, 11A and 11B, the area determination circuit 13 checks an arrangement of the discrimination colors of continuous pixels and compares with a color arrangement pattern which has been prepared, thereby performing an area discrimination regarding to which one of the painting area, line area, and the other area the discrimination color belongs. The detailed description of the area determination circuit 13 is omitted here.

An output of the area determination circuit 13 is inputted to the output color determination circuit 14. The output color determination circuit 14 discriminates the color to actually print from the outputs of the coding circuit 12 and area determination circuit 13. Namely, for example, in case of white data in the painting area as mentioned above, the color code data is converted to the marker color which has previously been discriminated and is outputted. A discrimination result of the output color determination circuit 14 is inputted to a decoder 15 and the 8-bit data of CMYK corresponding to the color code is reproduced. An output of the decoder 15 is inputted to an input A of the selector 16.

A black density determination circuit 17 is a circuit for calculating black density data in the case where the color data of the pixel is replaced to black from the input CMYK data. By the operation of the circuit 17, a halftone of black in the original image can be reconstructed at a high fidelity. An output of the black density determination circuit 17 is inputted to an input B of the selector 16. Namely, when the color of the pixel decided by the primary color determination circuit 11 is an achromatic color, the input B is selected by the selector 16 and a halftone of black is reproduced.

The primary color determination circuit 11 has a large weight in the block construction of FIG. 2. This is because when the primary color determination circuit 11 outputs an erroneous discrimination result, a color which doesn't exist on the original is printed in a print output. Therefore, a ground color removal circuit is provided for the primary color determination circuit 11.

Figure 3:
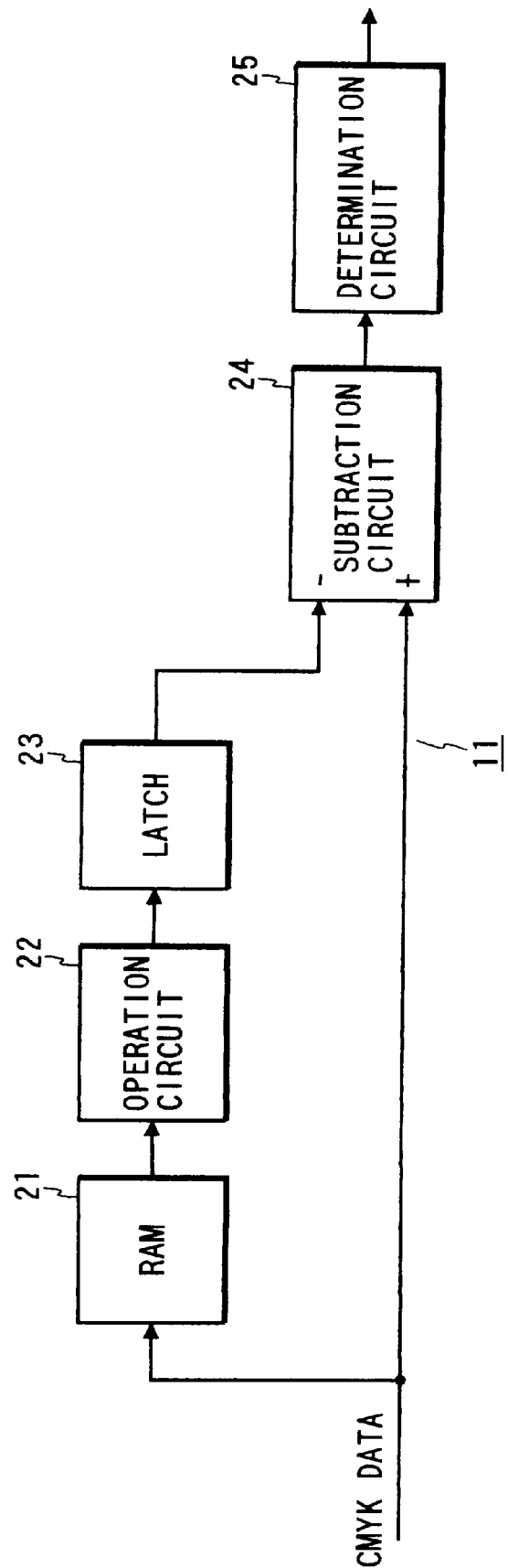
FIG. 3 is a block diagram showing an internal construction of a primary color determination circuit 11 in FIG. 2.

FIG. 3 is a block diagram showing an internal construction of the primary color determination circuit 11 in FIG. 2.

When the marker editing mode is selected by the operator, the CPU (not shown) first prescans. In this instance, the image data of CMYK that is inputted to the circuit is supplied to an RAM 21 and a plus terminal of a subtraction circuit 24. The input image data is successively stored into the RAM 21. When the prescan is finished, the stored data is sent to an operation circuit 22. The operation circuit 22 obtains the minimum value from the input data for each color of CMYK.

In addition to the image of the original and the colors of the markers, a ground color is included in the area read by the prescan. Since each color of CMYK of the image data or marker color data ought to be equal to or smaller than the ground color, the color that is expressed by a combination of the minimum values of C, M, Y, and K can be judged as a ground color.

The ground color data obtained by the operation circuit 22 is held by a latch 23. The holding data is inputted to a minus terminal of the subtraction circuit 24. After completion of the prescan, the reading operation is started. However, output data of the latch 23 doesn't change for a period of time when the reading operation is executed. Therefore, the data obtained by subtracting the ground color from the read image data is outputted from the subtraction circuit 24. An output of the subtraction circuit 24 is inputted to a determination circuit 25, thereby deciding the primary color.

Color distributions of marker colors in the cases where the ground color removal described above is not performed and where it was executed will now be described.

For example, explanation will be made on the assumption that the paper quality of the original is a yellowish regenerated paper and the marker colors which were colored on the original are red and pink.

Figure 4:
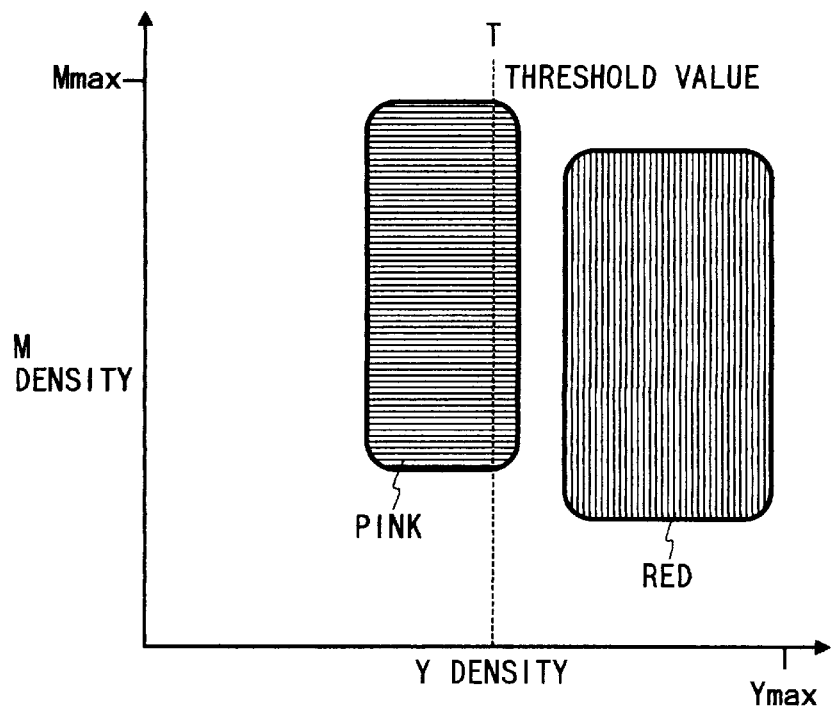
FIG. 4 is a diagram showing color distributions of a red marker and a pink marker when a ground color removal is not performed.

The primary color of the red marker is Y (yellow) and the primary color of the pink marker is M (magenta). FIG. 4 is a diagram showing color distributions of the red marker and pink marker on a Y (yellow)-M (magenta) plane in the case where the ground color removal is not performed. On the other hand, FIG. 5 is a diagram showing color distributions of the red marker and pink marker on a pure white original.

Strictly speaking, although a method of expressing a color distribution in a space including a C (cyan) axis is a general method, with respect to the red marker and pink marker, since C components are almost set to the 0 level, their color distributions are simply expressed by planes. The color distributions are set in consideration of the overpainting of the markers of the same color. It will be obviously understood that as the number of overpainting times is large, the color becomes dense.

Figure 5:
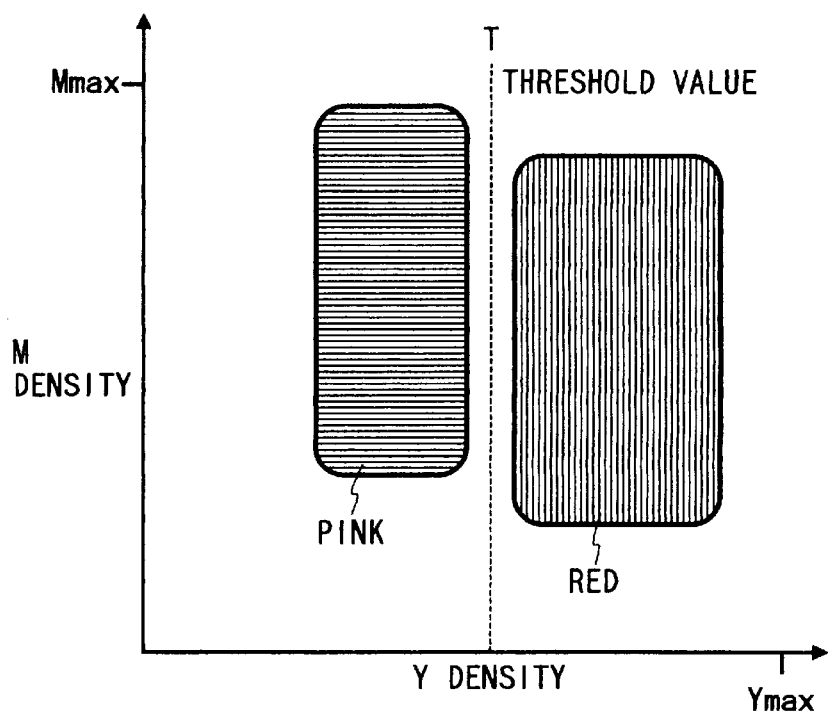
FIG. 5 is a diagram showing color distributions of a red marker and a pink marker on a pure white original.

As will be obviously understood from FIGS. 4 and 5, in case of a color distribution state of FIG. 5 using the original of the pure white ground, by setting a threshold level T in the diagram, red and pink can be accurately discriminated, respectively. However, when the threshold level T in FIG. 5 is fixed, as shown in FIG. 4, two distributing ranges are influenced by the Y component as a ground color, so that the Y component becomes strong. There is a possibility such that the primary color of pink is erroneously decided to be Y and that pink is erroneously judged to be red.

As means for eliminating such an inconvenience, a method of changing the setting of the above threshold value in accordance with the ground color is considered. However, when the yellowish state of the original is extreme, as shown in FIG. 6, a distributing range of red is deviated to the Ymax side and a range which overlaps the pink distributing range occurs.

Figure 6:
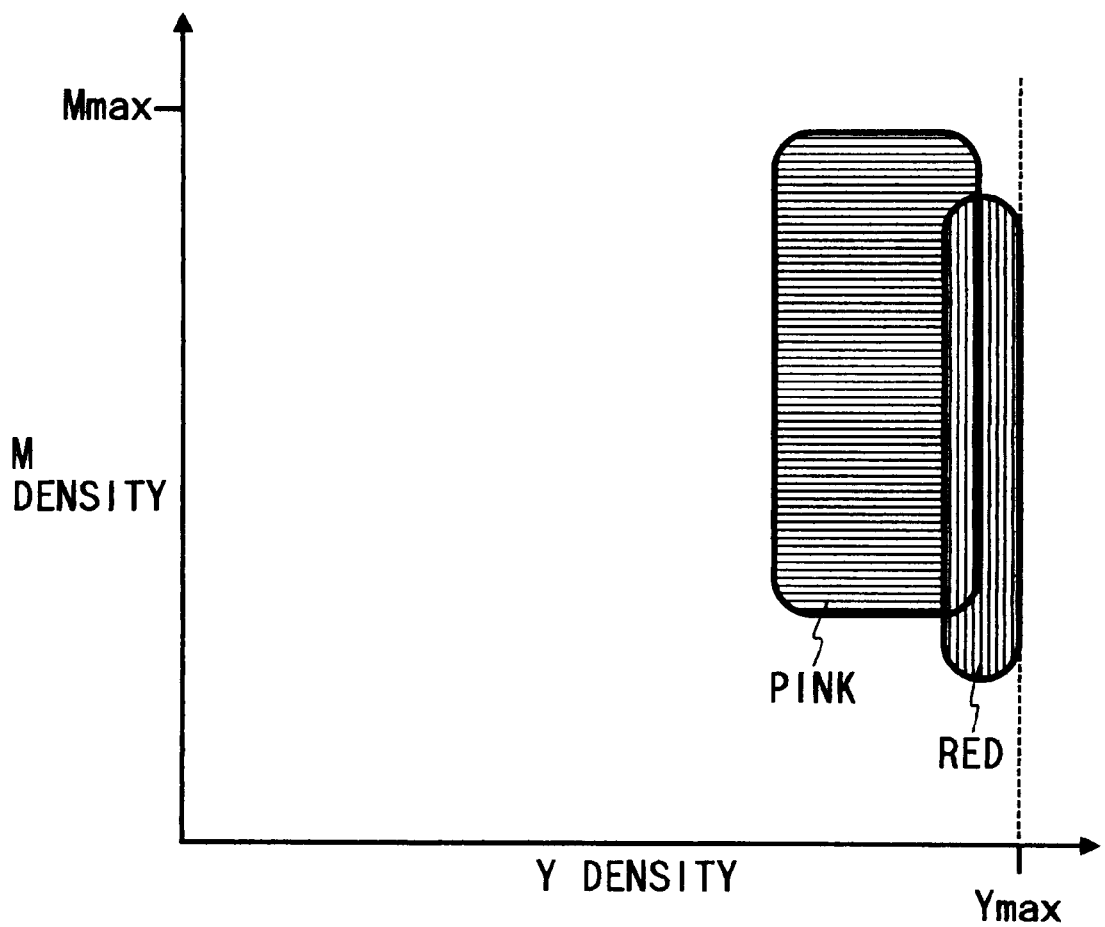
FIG. 6 is a diagram showing color distributions of a red marker and a pink marker in the case where a yellow state of an original is extreme.

In the distributing state of FIG. 6 as mentioned above, even if the threshold value is set to any value, the marker color cannot be accurately discriminated any more. Therefore, in case of performing a marker edition by the original having the ground color, the removal of the component of the ground color of the original can be regarded as most effective means.

The color distributions of the red marker and pink marker on the Y-M plane in the case where the ground color removal was executed almost become as shown in FIG. 5. Since the influence by the ground color is eliminated, in a manner similar to the original of the pure white ground color, the distributing ranges are perfectly separated and the erroneous judgment of the primary color, namely, the erroneous judgment of the marker color doesn't occur. It will be also obviously understood that the threshold value for color discrimination can be also set to a fixed value.

Although the above embodiment has been shown and described with respect to the example of the coloring by the original of the yellowish ground and the red and pink markers, a similar effect can be also derived even in a combination of the originals of different ground colors and the other color markers.

The second embodiment will now be described.

Figure 7:
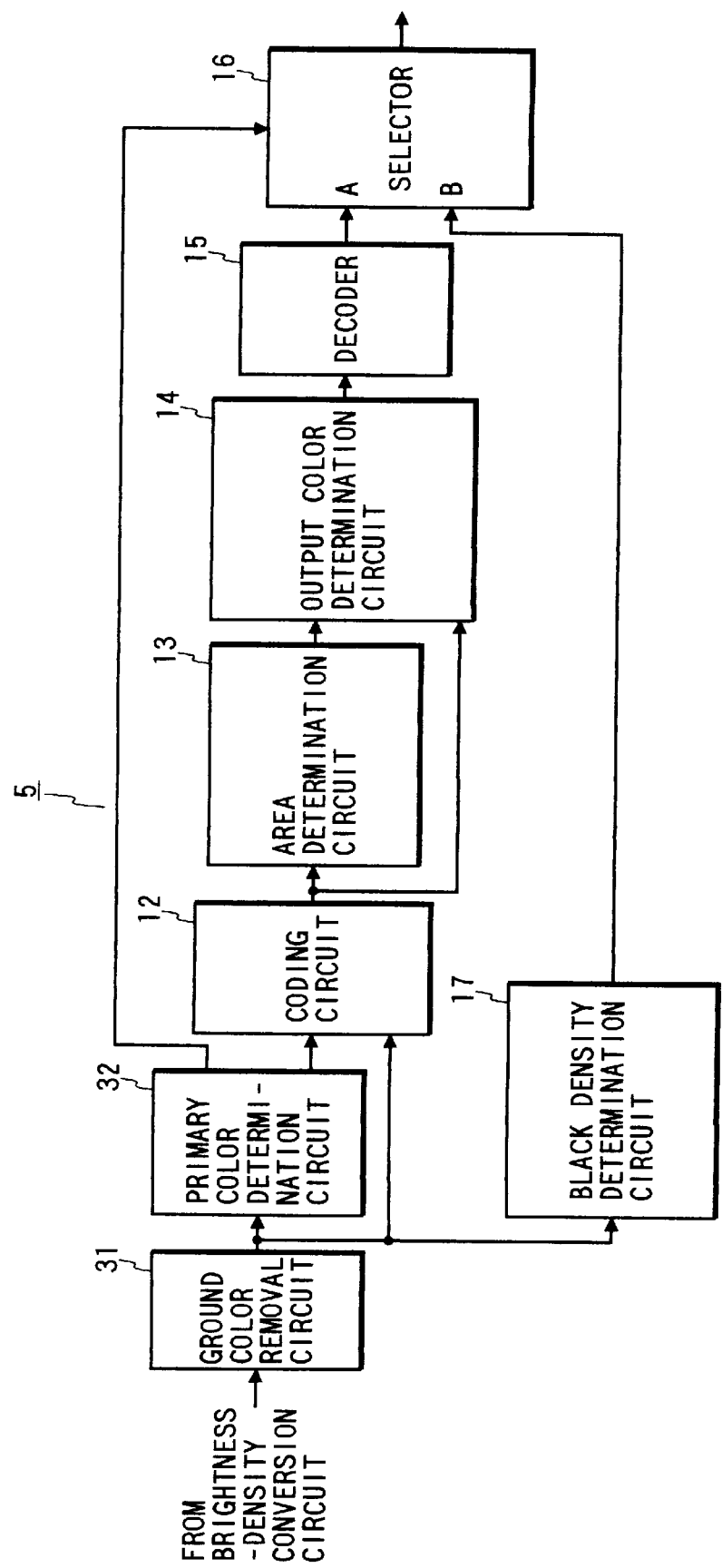
FIG. 7 is a block diagram showing an internal construction of the marker edition circuit 5 according to the second embodiment.

FIG. 7 is a block diagram showing an internal construction of the marker edition circuit 5 according to the second embodiment of the image processing apparatus of the invention.

In the first embodiment, an attention has been paid to the accurate judgment of the primary color and the ground color removal circuit has been provided in the primary color determination circuit 11. However, by changing the construction shown in FIG. 2 to a construction as shown in FIG. 7, since the ground color components of all of the internal data have been removed, not only the accurate judgment of the primary color, but also the coding process can be also accurately performed in the color coding circuit. Further, the more accurate black density can be also discriminated even in the black density determination circuit 17. That is, the circuit obtained by excluding the determination circuit 25 from the construction of FIG. 3 is used as a ground color removal circuit 31 and a primary color determination circuit 32 is changed to a circuit having only the function of the determination circuit 25 in FIG. 3. Since the above construction is obtained by merely exchanging the order of the data processes, a circuit scale is not increased by the change of the construction.

The third embodiment will now be described.

Figure 8:
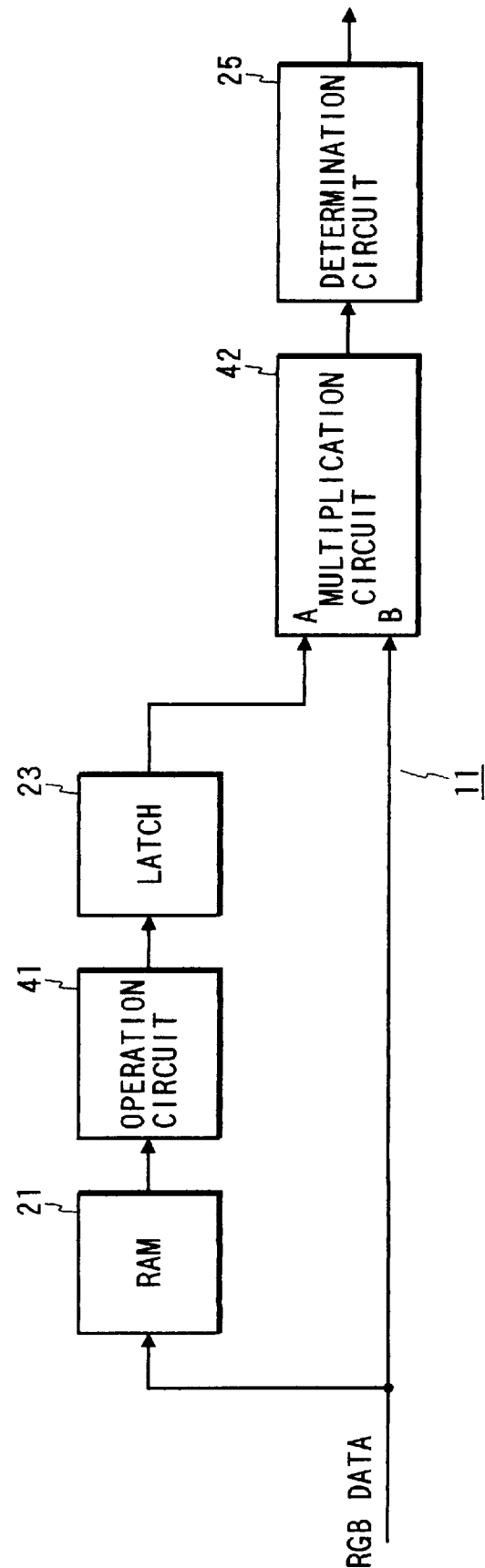
FIG. 8 is a block diagram showing an internal construction of the primary color determination circuit in the marker edition circuit 5 according to the third embodiment.

FIG. 8 is a block diagram showing an internal construction of the primary color determination circuit in the marker edition circuit 5 according to the third embodiment of the image processing apparatus of the invention.

In the above first and second embodiments, the color space that is handled in the marker edition circuit 5 in accordance with the construction of FIG. 1 has been described as a color space by the density data of CMYK. However, as an order of the image processes, there is also a case where the brightness-density conversion circuit 4 is arranged at the post stage of the marker edition circuit 5 or a circuit can be also omitted for simplicity of construction. In case of using such a construction, although the color space that is handled by the marker edition circuit 5 is satisfied by the brightness data of R, G, and B, the invention is also extremely effective even in case of a color space by the RGB brightness data. In this case, it is necessary to change the block constructional diagram shown in FIG. 3 to a construction as shown in FIG. 8.

In FIG. 8, an operation circuit 41 operates so as to obtain the maximum value of each color from the RGB brightness data that is outputted from the RAM 21 after completion of the prescan. In this instance, since each color of RGB of the image data or marker color data ought to be equal to or larger than the color of the ground of the original, the color that is expressed by a combination of the maximum values of R, G, and B can be regarded as a ground color.

The operation circuit 41 outputs the maximum value of RGB which was finally determined. The maximum value data is held by the latch 23. The holding data is inputted to a multiplication circuit 42 and the following operation is executed for each color of RGB.

$$Dout = 255 \times Din/Dunder$$

where, Dunder denotes data which is inputted to a terminal A of the multiplication circuit 42 and which was held in the latch 23, Din indicates data that is inputted to a terminal B in the image reading operation, and Dout shows an output of the multiplication circuit 42.

Since the maximum value which can be inputted to the terminal A is 255 for each of RGB, the ground color is corrected to R=G=B=255 by the above operation and the ground color is reconstructed in white. The ground color components of the marker colors are also corrected and the accurate primary color is determined.

Figure 9A:
FIGS. 9A and 9B are diagrams showing values of R, G, and B in a range between pure white and pure black with respect to a color on an original.
Figure 9B:
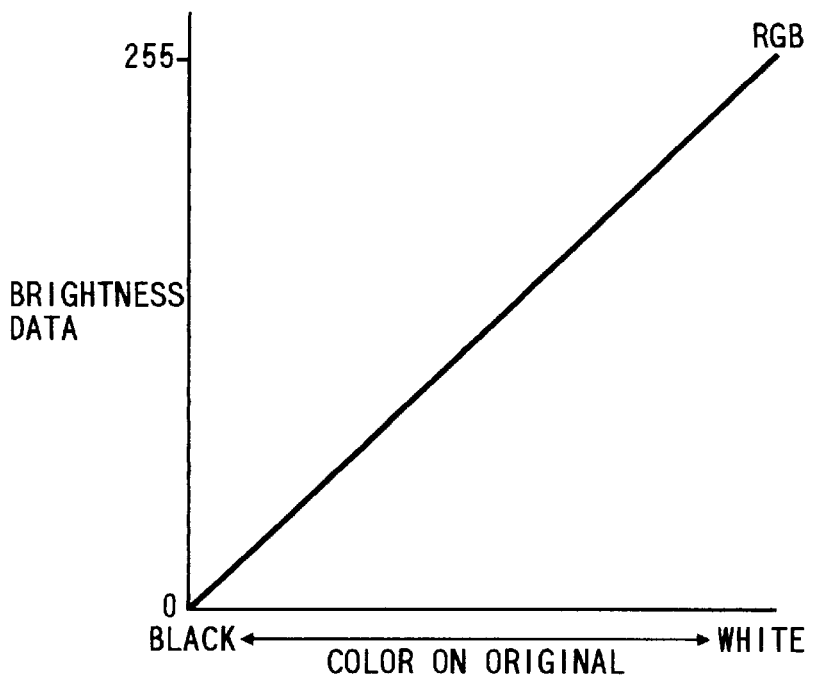
Figure 10A:
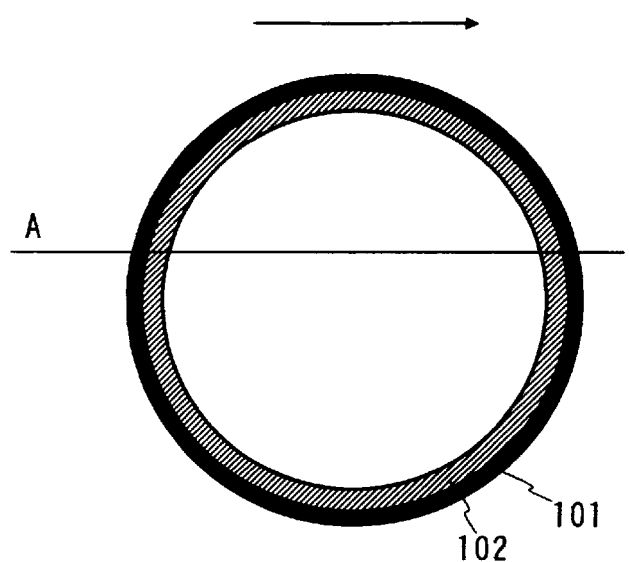
FIGS. 10A and 10B are diagrams for explaining a painting process.
Figure 10B:
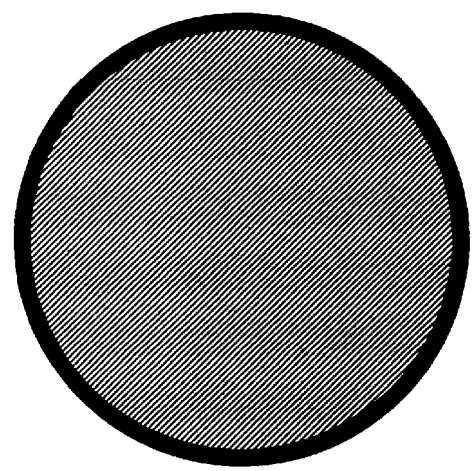
Figure 11A:
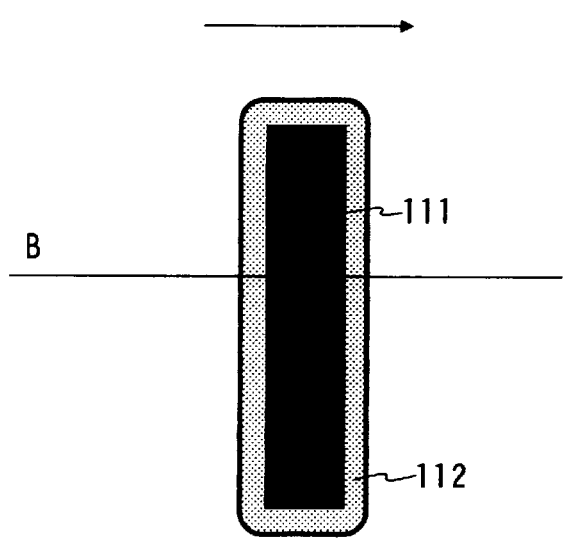
FIGS. 11A and 11B are diagrams for explaining a line mode.
Figure 11B:
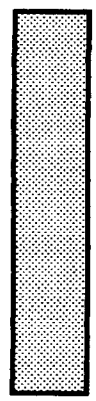

FIG. 9A shows values of R, G, and B in a range between pure white and pure black with respect to the color on the original having the yellowish ground color. From this diagram, a state in which the color is light yellow on the pure white side. FIG. 9B shows similar characteristics curves when the above operation was executed. From this diagram, it will be understood that the ground color is preferably corrected and the same characteristics as those of the original of the pure white ground color are shown.

By using such a construction, since it is sufficient to execute data processes of RGB for the data processes of CMYK in the first and second embodiments, the number of color components is changed from 4 to 3. There are, consequently, advantages regarding the circuit scale such that the capacity of the RAM 21 can be reduced into ¾ and the like.

Although the invention is not limited to the embodiments shown in the diagrams but many various modifications are possible. For example, although the data of the ground color has been obtained by the prescan, since there is no need to consider that the original image or marker color is remarkably continuous in the image data just after the start of the reading operation of the original to be subjected to the marker edition, a similar effect can be also derived even by omitting the prescan and by controlling such that the initial data in the reading operation is sampled to thereby discriminate the ground color. In this case, a desired time per one print can be reduced.

What is claimed is:

1. An image processing method comprising the steps of:
   inputting an image on a sheet with a mark made by a marker pen;
   removing a color of the sheet from the image input by said inputting step;
   discriminating a color of the mark on the sheet on the basis of the image from which the color of the sheet was removed by said removing step;
   processing an image in accordance with the color of the mark discriminated by said discriminating step; and
   a first selecting step of selecting either an image that has been processed by said processing step or an image having a predetermined color,
   wherein said method also includes a second selecting step of selecting one of a color scan mode to input a color original, and a marker edit mode to input an original added with the mark,
   when said color scan mode is selected, the image is output without being subjected to under-color removal by said removing step, and
   when said marker edit mode is selected, the image selected by said first selecting step is output, and
   wherein the mark on the original is discriminated by said discriminating step on the basis of the image subjected to color removal by said removing step.

2. A method according to claim 1, wherein said inputting step comprises a reading step for reading an image.

3. A method according to claim 1, further comprising detecting step for detecting a color of the sheet,
   wherein said removing step removes the color detected by said detecting step from every pixel of image input by said inputting step.

4. A method according to claim 3, wherein said detecting step detects a color of the sheet at a prescan operation.

5. A method according to claim 1, wherein said removing step removes a color of the sheet on the basis of CMYK data of the image.

6. A method according to claim 5, wherein said removing step removes a color of the sheet by subtracting CMYK data of the color of the sheet from CMYK data of every pixel of the image.

7. A method according to claim 1, wherein said removing step removes a color of the sheet on the basis of RGB data of the image.

8. A method according to claim 1, further comprising a printing step for printing the image processed by said image processing step.

9. A method according to claim 8, wherein said printing step utilizes a color printer.

10. An image reading method comprising the steps of:
    inputting an image on a sheet with a mark made by a marker pen;
    removing a color of the sheet from the image input by said inputting step; and
    discriminating a color of the mark on the sheet on the basis of the image from which the color of the sheet was removed by said removing step; and
    a first selecting step of selecting either an image that has been discriminated by said discriminating step or an image having a predetermined color,
    wherein said method also includes a second selecting step of selecting one of a color scan mode to input a color original, and a marker edit mode to input an original added with the mark,
    when said color scan mode is selected, the image is output without being subjected to under-color removal by said removing step, and
    when said marker edit mode is selected, the image selected by said first selecting step is output, and
    wherein the mark on the original is discriminated by said discriminating step on the basis of the image subjected to color removal by said removing step.

11. A method according to claim 10, wherein said inputting step comprises reading step for reading an image.

12. A method according to claim 10, further comprising a detecting step for detecting a color of the sheet,
    wherein said removing step removes the color detected by said detecting step from every pixel of image input by said inputting step.

13. A method according to claim 11, wherein said detecting step detects a color of the sheet at a prescan operation.

14. A method according to claim 10, wherein said removing step removes a color of the sheet on the basis of CMYK data of the image.

15. A method according to claim 14, wherein said removing step removes a color of the sheet by subtracting CMYK data of the color of the sheet from CMYK data of every pixel of the image.

16. A method according to claim 10, wherein said removing step removes a color of the sheet on the basis of RGB data of the image.

17. An image processing apparatus comprising:
    inputting means for inputting an image on a sheet with a mark made by a marker pen;
    removing means for removing a color of the sheet from the image input by said inputting means;
    discriminating means for discriminating the mark on the sheet on the basis of the image from which the color of the sheet was removed by said removing means;

processing means for processing an image in accordance with the mark discriminated by said discriminating means; and first selection means for selecting either an image that has been processed by said processing means or an image having a predetermined color, wherein said apparatus also includes second selection means for selecting one of a color scan mode to input a color original, and a marker edit mode to input an original added with the mark, when said color scan mode is selected, the image is output without being subjected to the removal by said removing means, and when said marker edit mode is selected, the image selected by said first selection means is output, and wherein the mark on the original is discriminated by said discriminating means on the basis of the image subjected to color removal by said removing means.

18. An apparatus according to claim 17, wherein said inputting means comprises reading means for reading an image.

19. An apparatus according to claim 17, further comprising detecting means for detecting a color of the sheet, wherein said removing means removes the color detected by said detecting means from every pixel of image input by said inputting means.

20. An apparatus according to claim 19, wherein said detecting means detects a color of the sheet at a prescan operation.

21. An apparatus according to claim 17, wherein said removing means removes a color of the sheet on the basis of CMYK data of the image.

22. An apparatus according to claim 21, wherein said removing means removes a color of the sheet by subtracting CMYK data of the color of the sheet from CMYK data of every pixel of the image.

23. An apparatus according to claim 17, wherein said removing means removes a color of the sheet on the basis of RGB data of the image.

24. An apparatus according to claim 17, further comprising printing means for printing the image processed by said image processing means.

25. An apparatus according to claim 24, wherein said printing means is a color printer.

26. An image processing apparatus comprising:

inputting means for inputting an image on a sheet having a mark made by a marker pen;

removing means for removing a color of the sheet from the image input by said inputting means;

discriminating means for discriminating a color of the mark on the sheet on the basis of the image from which the color of the sheet was removed by said removing means;

processing means for processing an image in accordance with the color of the mark discriminated by said discriminating means; and first selection means for selecting either an image that has been processed by said processing means or an image having a predetermined color, wherein said apparatus also includes second selection means for selecting one of a color scan mode to input a color original, and a marker edit mode to input an original added with the mark, when said color scan mode is selected, the image is output without being subjected to under-color removal by said removing means, and when said marker edit mode is selected, the image selected by said first selection means is output, and wherein the mark on the original is discriminated by said discriminating means on the basis of the image subjected to color removal by said removing means.

27. An apparatus according to claim 26, wherein said inputting means comprises reading means for reading an image.

28. An apparatus according to claim 26, further comprising detecting means for detecting a color of the sheet, wherein said removing means removes the color detected by said detecting means from every pixel of image input by said inputting means.

29. An apparatus according to claim 28, wherein said detecting means detects a color of the sheet at a prescan operation.

30. An apparatus according to claim 26, wherein said removing means removes a color of the sheet on the basis of CMYK data of the image.

31. An apparatus according to claim 30, wherein said removing means removes a color of the sheet by subtracting CMYK data of the color of the sheet from CMYK data of every pixel of the image.

32. An apparatus according to claim 26, wherein said removing means removes a color of the sheet on the basis of RGB data of the image.

33. An apparatus according to claim 26, further comprising printing means for printing the image processed by said image processing means.

34. An apparatus according to claim 33, wherein said printing means is a color printer.

35. An image reading apparatus comprising:

inputting means for inputting an image on a sheet with a mark made by a marker pen;

removing means for removing a color of the sheet from the image input by said inputting means;

discriminating means for discriminating the mark on the sheet on the basis of the image from which the color of the sheet was removed by said removing means; and first selection means for selecting either an image that has been discriminated by said discriminating means or an image having a predetermined color, wherein said apparatus also includes second selection means for selecting one of a color scan mode to input a color original, and a marker edit mode to input an original added with the mark, when said color scan mode is selected, the image is output without being subjected to under-color removal by said removing means, and when said marker edit mode is selected, the image selected by said first selection means is output, and wherein the mark on the original is discriminated by said discriminating means on the basis of the image subjected to color removal by said removing means.

36. An apparatus according to claim 35, further comprising detecting means for detecting a color of the sheet, wherein said removing means removes the color detected by said detecting means from every pixel of image input by said inputting means.

37. An apparatus according to claim 36, wherein said detecting means detects a color of the sheet at a prescan operation.

38. An apparatus according to claim 36, wherein said removing means removes a color of the sheet on the basis of CMYK data of the image.

39. An apparatus according to claim 38, wherein said removing means removes a color of the sheet by subtracting CMYK data of the color of the sheet from CMYK data of every pixel of the image.

40. An apparatus according to claim 36, wherein said removing means removes a color of the sheet on the basis of RGB data of the image.

41. An image reading apparatus comprising:

inputting means for inputting an image on a sheet with a mark made by a marker pen;

removing means for removing a color of the sheet from the image input by said inputting means;

discriminating means for discriminating a color of the mark on the sheet on the basis of the image from which the color of the sheet was removed by said removing means; and first selection means for selecting either an image that has been discriminated by said discriminating means or an image having a predetermined color, wherein said apparatus also includes second selection means for selecting one of a color scan mode to input a color original, and a marker edit mode to input an original added with the mark, when said color scan mode is selected, the image is output without being subjected to under-color removal by said removing means, and when said marker edit mode is selected, the image selected by said first selection means is output, and wherein the mark on the original is discriminated by said discriminating means on the basis of the image subjected to color removal by said removing means.

42. An apparatus according to claim 41, wherein said inputting means comprises reading means for reading an image.

43. An apparatus according to claim 41, further comprising detecting means for detecting a color of the sheet, wherein said removing means removes the color detected by said detecting means from every pixel of image input by said inputting means.

44. An apparatus according to claim 43, wherein said detecting means detects a color of the sheet at a prescan operation.

45. An apparatus according to claim 41, wherein said removing means removes a color of the sheet on the basis of CMYK data of the image.

46. An apparatus according to claim 45, wherein said removing means removes a color of the sheet by subtracting CMYK data of the color of the sheet from CMYK data of every pixel of the image.

47. An apparatus according to claim 41, wherein said removing means removes a color of the sheet on the basis of RGB data of the image.

48. An image processing method comprising the steps of:

inputting an image on a sheet with a mark made by a marker pen;

removing a color of the sheet from the image input by said inputting step;

discriminating the mark on the sheet on the basis of the image from which the color of the sheet was removed by said removing step;

processing an image in accordance with the mark discriminated by said discriminating step; and a first selecting step of selecting either an image that has been processed by said processing step or an image having a predetermined color, wherein said method also includes a second selecting step of selecting one of a color scan mode to input a color original, and a marker edit mode to input an original added with the mark, when said color scan mode is selected, the image is output without being subjected to under-color removal by said removing step, and when said marker edit mode is selected, the image selected by said first selecting step is output, and wherein the mark on the original is discriminated by said discriminating step on the basis of the image subjected to the color removal by said removing step.

49. A method according to claim 48, wherein said inputting step comprises a reading step for reading an image.

50. A method according to claim 48, further comprising detecting step for detecting a color of the sheet, wherein said removing step removes the color detected by said detecting step from every pixel of image input by said inputting step.

51. A method according to claim 50, wherein said detecting step detects a color of the sheet at a prescan operation.

52. A method according to claim 48, wherein said removing step removes a color of the sheet on the basis of CMYK data of the image.

53. A method according to claim 52, wherein said removing step removes a color of the sheet by subtracting CMYK data of the color of the sheet from CMYK data of every pixel of the image.

54. A method according to claim 48, wherein said removing step removes a color of the sheet on the basis of RGB data of the image.

55. A method according to claim 48, further comprising printing step for printing the image processed by said image processing step.

56. A method according to claim 55, wherein said printing step utilizes a color printer.

57. An image reading method comprising the steps of:

reading an image on a sheet with a mark made by a marker pen;

removing a color of the sheet from the image read by said reading step;

discriminating the mark on the sheet on the basis of the image from which the color of the sheet was removed by said removing step; and a first selecting step of selecting either an image that has been discriminated by said discriminating step or an image having a predetermined color, wherein said method also includes a second selecting step of selecting one of a color scan mode to input a color original, and a marker edit mode to input an original added with the mark, when said color scan mode is selected, the image is output without being subjected to under-color removal by said removing step, and when said marker edit mode is selected, the image selected by said first selecting step is output, and wherein the mark on the original is discriminated by said discriminating step on the basis of the image subjected to color removal by said removing step.

58. A method according to claim 57, further comprising a detecting step for detecting a color of the sheet, wherein said removing step removes the color detected by said detecting step from every pixel of image input by said inputting step.

59. A method according to claim 58, wherein said detecting step detects a color of the sheet at a prescan operation.

60. A method according to claim 58, wherein said removing step removes a color of the sheet on the basis of CMYK data of the image.

61. A method according to claim 60, wherein said removing step removes a color of the sheet by subtracting CMYK data of the color of the sheet from CMYK data of every pixel of the image.

62. A method according to claim 58, wherein said removing step removes a color of the sheet on the basis of RGB data of the image.

63. An apparatus according to claim 35, wherein said inputting means comprises reading means for reading an image.

* * * * *